Figure 1:
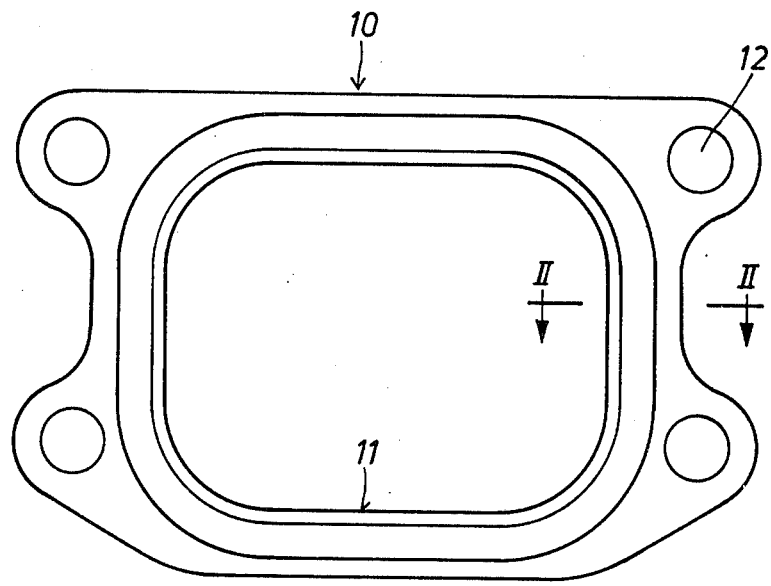

United States Patent [19]

Schlaupitz et al.

[11] Patent Number: 4,471,968
[45] Date of Patent: Sep. 18, 1984

[54] FLAT SEAL

[75] Inventors: Manfred Schlaupitz; Olaf Jautelat, both of Friedrichshafen, Fed. Rep. of Germany

[73] Assignee: Motoren- und Turbinen-Union Friedrichshafen GmbH, Fed. Rep. of Germany

[21] Appl. No.: 38,712

[22] Filed: May 14, 1979

Related U.S. Application Data

[63] Continuation of Ser. No. 678,259, Apr. 19, 1976, abandoned, which is a continuation of Ser. No. 506,012, Sep. 12, 1974, abandoned.

[30] Foreign Application Priority Data

Oct. 13, 1973 [DE] Fed. Rep. of Germany ....... 2351552

[51] Int. Cl.$^3$ ............................................. F16B 43/00
[52] U.S. Cl. ................................ 277/235.13; 277/211
[58] Field of Search ............... 277/211, 235 A, 235 B, 277/236, 237 R, 166

[56] References Cited

U.S. PATENT DOCUMENTS 2,771,369  11/1956  Leach ................................. 277/166
3,627,334  12/1971  Reddy ................................. 27/166

FOREIGN PATENT DOCUMENTS 931710  7/1963  United Kingdom ............ 277/235 B

Primary Examiner—Robert I. Smith
Attorney, Agent, or Firm—Craig & Burns

[57] ABSTRACT

A flat seal with at least one aperture through which flows a medium to be sealed, particularly for use in the exhaust gas lines of internal combustion engines which are operated at high exhaust gas temperatures; the flat seal thereby consists of a sheet metal member with a coating of a material on the basis of a synthetic fluorine compound and includes at the edge of the aperture a circumferential S-shaped double-corrugation.

4 Claims, 4 Drawing Figures

FLAT SEAL

This is a continuation of application Ser. No. 678,259, filed Apr. 19, 1976, and now abandoned which is a continuation of Ser. No. 506,012 filed Sept. 12, 1974 and now abandoned.

The present invention relates to a flat seal with at least one flow aperture or opening for the medium to be sealed off, especially for use in exhaust gas lines of internal combustion engines which are operated at high exhaust gas temperature.

In an internal combustion engine whose exhaust gas temperature amounts to up to above 900° C., the exhaust gas line reaches a body temperature between 400° C. and 550° C., at red glow depending on instantaneous power output of the internal combustion engine. As a result of this high body temperature, the sealing surfaces of the exhaust gas line and in part those of the cylinder heads are so strongly warped and distorted already after the run-in period that a gas-tightness could not always be achieved with the sealing washers inserted heretofore notwithstanding the fine-machining of the sealing surfaces. As the sole solution, which however, did not bring about a permanent success in all cases, only the after-machining or refinishing of the sealing surfaces of the exhaust gas line after the run-in period was known heretofore.

It is now the aim of the present invention to provide a flat seal which compensates for the sealing surface warp or distortion occurring during operation and which assures a reliable gas-tightness over longer operating periods at high ambient temperatures.

The underlying problems are solved according to the present invention in that the flat seal consists of a sheet metal member with a coating of a synthetic material on the basis of a fluorine compound and includes a circumferential S-shaped double-groove or double-corrugation at the edge of the through-opening.

A double-groove or double-corrugation effects a line-shaped abutment of the flat seal at the sealing surfaces with high contact pressure whereby the coarse unevenesses of the warped sealing surfaces are compensated for. The fine-seal of the still remaining gaps against gas discharge is achieved by the coating with a synthetic material on the basis of a fluorine compound.

According to the present invention, the sheet metal member is coated on all sides with the synthetic material involving a fluorine compound. It is possible thereby to apply the coating economically by a spraying method.

According to another embodiment of the present invention, the sheet metal member is coated with the fluorine compound synthetic material only within the area of the double-groove as double-corrugation on both sides thereof whereby the material expenditures in expensive synthetic fluorine compound materials is reduced.

By reason of the fact that the sheet metal member according to the present invention consists of a heat-resistant or high heat-resistant material of conventional type, the elasticity of the flat seal remains preserved also at the high body temperatures of the exhaust gas line.

The advantages achieved with the present invention reside in particular in that the flat seal permits the attainment of an excellent continuing gas-tightness also with warped sealing surfaces, that the previously required fine-machining of the sealing surfaces is dispensed with, that the flat seal no longer burns fast on the sealing surfaces, that the flat seal is particularly temperature-resistant and that the cost-increasing after-operations of warped sealing surfaces are obviated.

Figure 2:
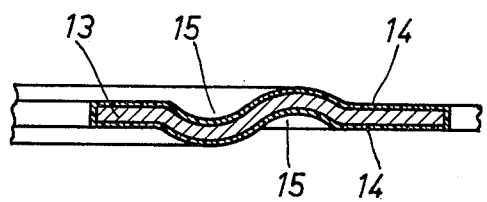
Figure 3:
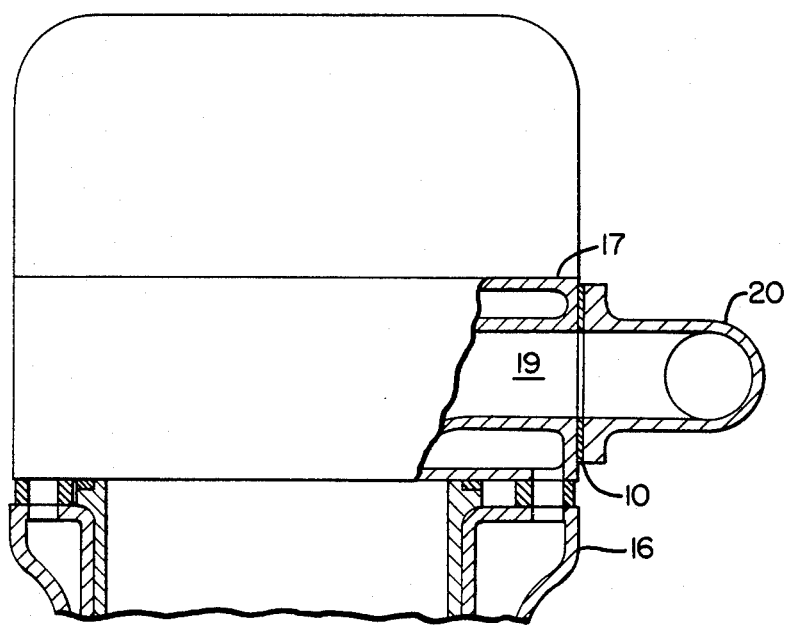
Figure 4:
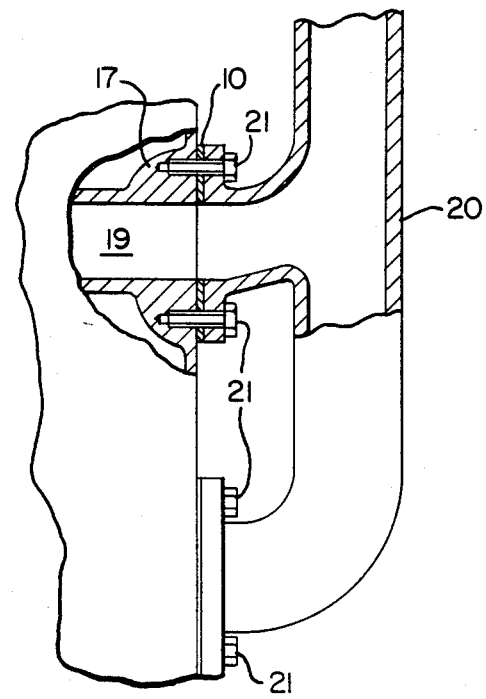

These and further objects, features and advantages of the present invention will become more apparent from the following description when taken in connection with the accompanying drawing which shows, for purposes of illustration only, one embodiment in accordance with the present invention, and wherein:

FIG. 1 is a plan view of a flat seal in accordance with the present invention; and FIG. 2 is a cross-sectional view, on an enlarged scale, taken along line II—II in FIG. 1, with a coating on all sides thereof.

Referring now to the drawing wherein like reference numerals are used throughout the two views to designate like parts, a flat seal generally designated by reference numeral 10 which is provided with a flow-opening or aperture 11 for the medium to be sealed and with apertures 12 for extending therethrough fastening bolts, is arranged, for example, between the exhaust gas line and the cylinder head of an internal combustion engine. The flat seal 10 consists of a sheet metal member 13 (FIG. 2) with a coating of synthetic material on the basis of a fluorine compound and includes at the edge of the opening 11 a circumferentially extending S-shaped double-groove or double-corrugation 15.

This double-corrugation 15 imparts to the flat seal 10 a certain flexibility perpendicularly to the sealing surfaces and produces a line-shaped abutment with high contact pressure at the sealing surfaces, whereby the coarse unevenesses of the warped sealing surfaces are compensated. The fine-seal of the remaining gap against gas discharge is then achieved by the synthetic fluorine compound coating.

The previously required expensive fine-machining of the sealing surfaces could be dispensed with by the use of the coated flat seal and could be replaced by a machining method with coarser surface quality, more favorable from a cost point of view.

With the temperatures measured in the exhaust gas line, the synthetic fluorine compound material is heated within the area of its line-shaped abutment of the flat seal to a temperature above its crystalline melting point of 327° C. The gelatinous melt resulting thereby possesses an extremely high viscosity whereby it does not flow but far-reachingly maintains its geometric form.

Additionally, a reversible volume enlargement of the fluorine compound of about 30% takes place within the temperature range from room temperature up to the crystalline melting point of 327° C. This volume enlargement and the influence of the high contact pressure at the line-shaped abutment of the flat seal effect that the melted fluorine compound completely fills out the unevenesses which otherwise remain with a non-coated sheet metal member.

The sheet metal member 13 is coated on all sides with the fluorine compound which enables the application of a spray method. In order to reduce the material expenditures in expensive fluorine compounds, it is possible to undertake the coating only within the area of the double-corrugation on both sides thereof. Of the many fluorine compounds which are presently commercially available and which are suitable for this invention are, for example, the various types of polytetrafluoroethylene, such as "Teflon TFE", "Hostaflon TF", "Teflon TFP" etc.

In order to obtain the elasticity of the flat seal also at the high occurring body temperatures in the exhaust gas line, the sheet metal member 13 consists of a heat-resistant or high heat-resistant material of conventional type, for example, of X 12 Cr Ni Ti 189 steel or of other so-called X-steels.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An internal combustion engine comprising:
    an engine block,
    cylinder means provided in said engine block,
    exhaust port means for directing exhaust gases having an exhaust gas temperature of up to 900° C. from said cylinder means,
    at least one cylinder head means mounted on said engine block,
    exhaust gas line means mounted at said cylinder head means and communicating with said exhaust port means for directing the flow of hot exhaust gases from said cylinder means with ambient operating temperatures of the exhaust gas line means and exhaust port means being in the range of 400° C.–550° C., and
    flat seal means interposed between said exhaust gas line means and said cylinder head means, said flat seal means including a flat sheet metal member provided with at least one aperture means communicating with said exhaust port means for enabling a flow of hot exhaust gases therethrough to the exhaust gas line means, a synthetic material coating of a polytetrafluoroethylene compound provided on said sheet metal member, said synthetic material coating of said flat seal means being in contact with said exhaust gas line means which has an ambient operating temperature in the range of 400° C.–550° C., whereby, during operation of said engine, said synthetic material coating is in contact with a surface having a temperature of 400° C.–550° C., and a circumferentially substantially S-shaped double-corrugation provided along the edge of said at least one aperture means, whereby said flat seal means compensates for the warpage of the surfaces of the cylinder head means and exhaust gas line means adjacent said flat seal means, which warpage occurs during exposure of said surfaces to operating temperatures, with said S-shaped double corrugation acting to seal the coarse unevenness of the warped surfaces and the synthetic material coating acting to seal any remaining gaps.

2. An engine according to claim 1, wherein said sheet metal member is coated on all sides with the polytetrafluoroethylene compound.

3. An engine according to claim 1, wherein said sheet metal member is coated with the polytetrafluoroethylene compound material only within an area of said double-corrugation on both sides thereof.

4. An engine according to one of claims 1, 2, or 3, wherein said sheet metal member consists of a heat resistant material.

* * * * *